Feb. 15, 1955   C. P. KRUPP   2,701,899
INFLATABLE SEALING STRIP
Filed June 26, 1948
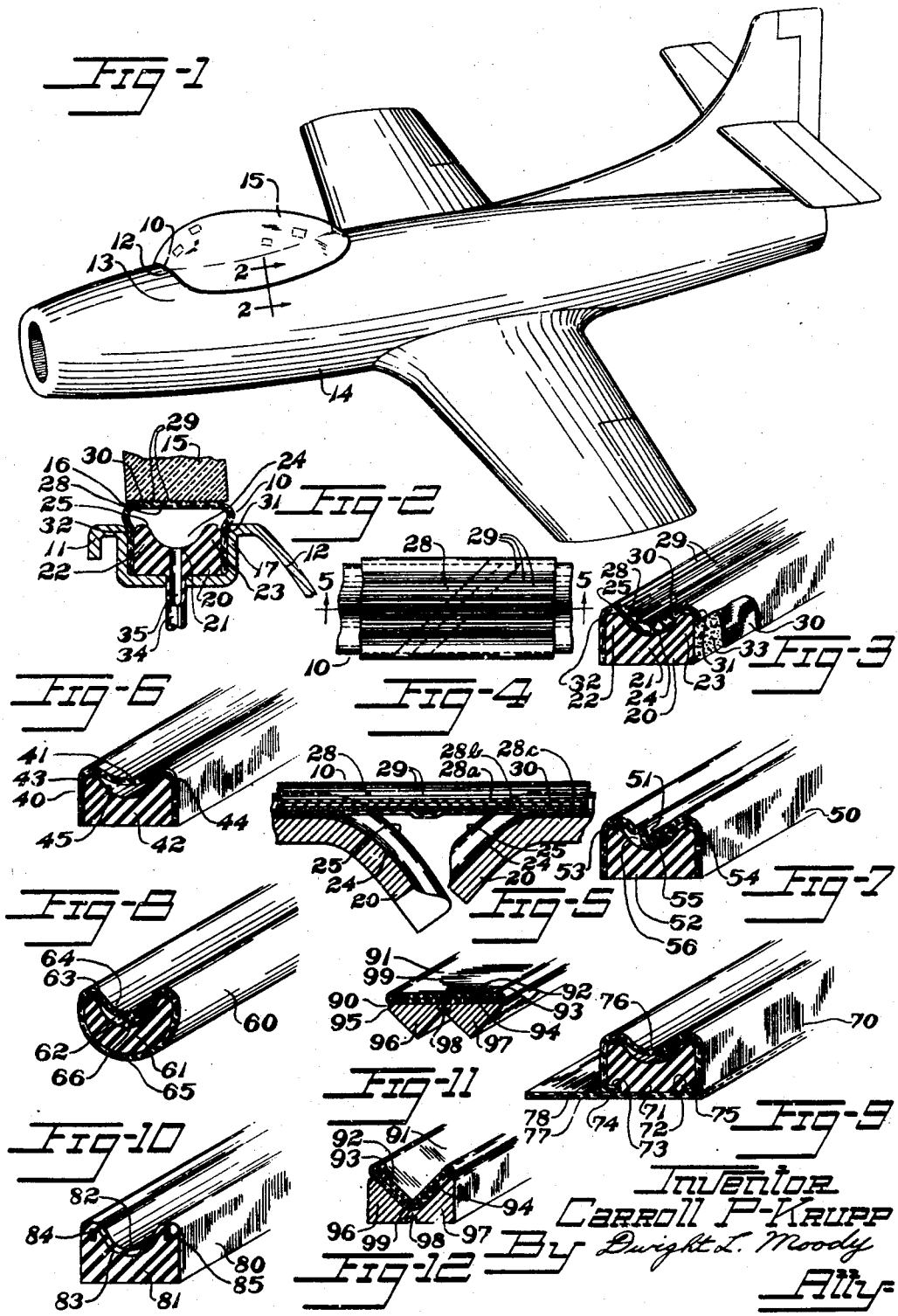
Inventor
Carroll P. Krupp
By Dwight L. Moody
Atty

United States Patent Office 2,701,899
Patented Feb. 15, 1955

2,701,899

INFLATABLE SEALING STRIP

Carroll P. Krupp, Barberton, Ohio, assignor to The B. F. Goodrich Company, New York, N. Y., a corporation of New York Application June 26, 1948, Serial No. 35,354

17 Claims. (Cl. 20—69)

The invention relates to inflatable sealing strips for spaced-apart elements and especially to sealing closures such, for example, as aircraft canopy seals for apertured wall subject to differential pressures at the two sides of the walls.

Heretofore, ordinary extruded rubber tubing of circular, square or other shape in cross-section in the uninflated condition and spliced together by a butt joint perpendicular to the longitudinal axis of the tubing so as to be endless, has been utilized to close the space between the canopy and the wall of an aircraft compartment or cockpit, the latter having a condition of internal pressure for high-altitude flight purposes. Inasmuch as the pressure generally used to inflate the tubing is about 5 to 10 pounds per square inch, the tubing has been provided with a very thin, all-rubber wall of uniform thickness circumferentially of the same to make possible limited distension for closing purposes.

These inflatable closures have been difficult to produce and are necessarily of fragile construction. Their fragility has resulted in blowouts of the inflating tubing which endangers the lives of the persons in the compartment due to the sudden reduction in pressure therein. It has also resulted in objectionable distortion and an undesirable wall-collapsing tendency of the uninflated tubing, by virtue of its locally stressed condition, where it conforms to the compound curvature of a support frame underlying the canopy. The substantially stressed wall of the tubing resists distension against the canopy with consequent faulty sealing at such regions of curvature.

An object of the invention is to provide an aircraft canopy seal overcoming effectively the foregoing and other disadvantages of the prior constructions.

Other objects are to provide an improved inflatable sealing strip which seals effectively at low inflation pressures; to provide for a nested relationship of portions of the strip in the uninflated condition; to provide for resisting blow-out of the strip despite extensive distension thereof; to provide for effective sealing along the strip including regions of curvature thereof; to provide for inherent resumption by the strip of its nested arrangement upon release of the inflation pressure; to provide for strips of different sizes of lateral widths wherein each size has provision of varying distension and deflection in accordance with the particular application of the strip; to provide for inherently resisting objectionable collapse and distortion of a non-distensible wall portion of the strip; and to provide for simplicity and durability of construction, convenience and method of manufacture, and for effectiveness of operation.

These and other objects and advantages of the invention will be apparent from the following description.

In the accompanying drawings which form a part of this specification and in which like numerals are employed to designate like parts throughout the same, Fig. 1 shows a canopy seal of an aircraft constructed in accordance with and embodying the invention, Fig. 2 is a sectional view taken along line 2—2 of Fig. 1 showing an inflatable endless strip of canopy seal in the inflated condition contacting the canopy in sealing relation therewith, parts being broken away, Fig. 3 is a sectional and perspective view of the inflatable endless strip in the deflated condition after vulcanization and before mounting on the aircraft, parts being broken away, Fig. 4 is a plan view from above of the strip showing the joinder of end portions thereof, parts being broken away, Fig. 5 is a sectional view taken along line 5—5 of Fig. 4, parts being in separated relation for subsequent joinder, Fig. 6 is a sectional and perspective view showing in the uninflated condition a modified construction of the inflatable sealing strip, parts being broken away, Figs. 7, 8, 9 and 10 are views like Fig. 6 but showing other modifications of the strip, Fig. 11 is a sectional and perspective view of another modified construction of the inflatable sealing strip as assembled and before final forming and vulcanization, parts being broken away, and Fig. 12 is a view like Fig. 11 but showing the strip in its final form after vulcanization and in the uninflated condition.

In the illustrative embodiment of the invention shown especially in Figs. 1 to 5, inclusive, the construction of the aircraft canopy seal includes an inflatable endless sealing strip 10 disposed peripherally about and secured, desirably adhesively, to a channeled support member 11, the strip 10 being preformed to the shape and peripheral contour of the support member. The support member extends entirely about the margin 12 of a cockpit aperture in an outer, curved wall 13 of a fuselage 14 which may separably support a streamlined canopy 15 of stiff, transparent plastic material overlying the cockpit aperture, the canopy 15 being separably attached to the fuselage 14 by any suitable attaching means used for this purpose in aircraft construction. The peripheral edge surface 16 of the canopy 15 overlies a generally U-shaped channel portion 17 of the support member 11 in spaced-apart, adjacent relation to the latter and is held thus so as to permit contact of the inflatable endless strip 10 in the inflated condition.

The inflatable sealing strip has a base portion 20 of flexible fluid-tight construction and of material such, for example, as resilient rubber, natural or synthetic, or other rubber-like or elastic plastic material capable of being extruded or otherwise conveniently formed to shape and capable of withstanding weather, sunlight, ozone, extreme temperatures, oil and other deteriorating conditions encountered especially in aircraft service. The base portion 20, which is desirably extruded in strip form, has a bottom portion or wall 21 interconnecting upwardly projecting, laterally spaced-apart marginal portions or side walls 22, 23 providing a longitudinal recess or groove 24, desirably of curved configuration with inclined or sloping sides, in the upper face 25 of the base portion. The lateral configuration, width and depth dimensions of the groove are such that they facilitate a nested disposition of an engaging portion 28 in the groove for the uninflated condition of the strip while freedom of movement of the engaging portion to and from its nested position under inflation and deflation of the strip is facilitated. The base portion may be generally U-shaped in cross-section for disposition in the channel portion 17.

Although the proportions, shape and wall thickness of the base portion may vary from those shown especially in Fig. 3, it is desirable that the wall shape, thickness and stiffness be sufficient to inherently resist collapse of the base portion and maintain the position of the side walls 22, 23 in their spaced-apart, upstanding relation. Thus, the U-shape is susbtantially maintained despite disposition of the strip in the uninflated condition at regions of curvature of the support member. The construction results advantageously in the base portion 20 sustaining to a large extent the stresses due to the mounting of the sealing strip, especially upon surfaces of compound and/or sharp curvature.

The inflatable sealing strip includes the distensible engaging portion 28 in nested relationship to the base portion, the fluid-tight wall of which portion 28 is desirably relatively thin, stretchable, and flexible as compared to the base portion and may be made of a suitable soft compound of resilient natural rubber, or other suitable rubber-like material. The engaging portion may be of composite construction and have at its outer surface a thin layer 28a of oil-resistant synthetic rubber material overlying and united with the relatively thicker, underlying layer 28b of natural rubber material. The portion 28 may have a plurality of longitudinal extending projections or ribs 29, 29 spaced-apart laterally for contacting the canopy, and desirably has united with the rubber material a reinforcement 30 of elastic fabric such, for example, as knitted or stickinette material of nylon, silk, cotton, glass, or other suitable filamentary material. The reinforcement 30 is adjacent the inner surface of the engaging portion 28 overlying the upper face 25 and is arranged for stretchability laterally of the strip with substantially less stretchability longitudinally of the strip to provide directional extensibility of the engaging portion. The reinforced and composite construction resists breakage of the engaging portion at its regions of sharp flexure, especially adjacent the upper region of the side walls 22, 23, and resists blow-out of the strip and deterioration from the action of oil, weather and other harmful conditions.

The engaging portion 28 extends laterally of the base portion 20 in overlying, separated relation to the upper face 25 intermediate the margins at 31, 32 thereof and may be adhesively secured in overlapping relation to the side walls 22, 23 as by a suitable rubber cement 33, which arrangement resists lateral distortion of the side walls under inflation of the strip. Although the surface of the fabric reinforcement 30 adiacent the upper face 25 and between the margins 31, 32 may be free of all rubber-like material for avoiding bonding of the engaging portion to the base portion at the upper face 25 during vulcanization of the strip; it is desirable that such surface of the reinforcement have a relatively thin coating 28c of rubber-like material in which case anti-bonding material such as soapstone is in the space between the upper face 25 and the engaging portion 28 during vulcanization to prevent bonding. The latter arrangement is advantageous in that fluid tightness is maintained even though the outer rubber surface be damaged or broken in use.

The engaging portion 28 has a looseness or fullness of the material at its intervening region which extends from one position of joinder with the base portion at a margin 31 to the other position of joinder at the other margin 32. The fullness of the engaging portion is disposed in a nested manner downwardly in the recess 24 in the uninflated condition of the strip and is distensible upwardly against the canopy in the inflated condition. Thus the lateral extent of the engaging portion 28 at its intervening region between the positions of joinder, by virtue of the fullness, is greater than the lateral distance directly across the strip from one such position to the other so that at least part of the engaging portion depends downwardly in the groove 24 as shown especially in Fig. 3. Also, the lateral extent of the engaging portion at said intervening region thereof may vary, as shown especially in Figs. 6 and 7, to make possible different extents of distension of the same size strip for effectively sealing against the canopy despite irregularity of the edge surface 16 thereof and accommodating variation in the particular spacing between the support member 11 and the canopy 15 of the particular application.

In the embodiment shown in Figs. 1 to 5, inclusive, the lateral extent of the engaging portion at the aforesaid intervening region is substantially equal to the lateral extent of the curved contour of the upper face 25 between its margins 31, 32 so that the engaging portion is disposed substantially conformingly to such contour in the uninflated condition. The construction offers little or no restriction to the movement of the engaging portion upwardly under inflation and the inherent resumption of the engaging portion of its nested disposition upon deflation of the strip.

The base portion 20 after its extrusion as a continuous strip and the engaging portion 28, both of which are desirably in a semi-cured state during assembly in strip form, may be united integrally as by vulcanization under heat and pressure after being assembled and after the ends of the strip have been diagonally spliced together, as shown especially in Figs. 4 and 5, to provide the desired endless construction. The diagonal joint arrangement makes possible substantially the same extent of distention of the engaging portion at the joint as at regions to the sides of the joint for uniformity of sealing along the strip. Instead of the endless arrangement, the strip, if desired, may be used in continuous strip form by sealing the end portions thereof as by rubber cement adhering the intervening separated region of the engaging portion to the base portion at such end portions.

The engaging portion, by virtue of its thinness and flexibility prior to vulcanization, is not self-supporting and readily conforms to the contour of the upper face for backing support by the base portion during the vulcanization, and by virtue of its thinness and resiliency after vulcanization, inherently resumes its nested disposition in the groove upon deflation of the strip.

For inflation purposes a hollow tube 34 of suitable rubber-like material may be secured to the base portion 20 in communication with the space between the base portion and the engaging portion through a suitable opening 35 in the base portion. The tube may extend through the channel portion 17 and be connected to a suitable source of inflation medium or air under pressure (not shown) located, for example, in the fuselage 14.

The inflatable endless sealing strip 10 in the cured, preformed, and uninflated condition is mounted on the support member 11 with the base portion 20 seated in the channel portion 17 and desirably adhered thereto by a suitable rubber cement of the air-curing type. The curved configuration of the channeled support member about the margin of the cockpit aperture results in regions of relatively sharp, compound curvature, especially toward the front of the canopy 15, necessitating substantial flexure of the strip 10.

The stretchable construction of the strip especially the engaging portion 28 together with the continuity of support afforded the latter by the resilient base portion prevents effectively objectionable tautness or looseness and buckling of the engaging portion at the different regions of curvature of the support member. This advantageously facilitates the provision of substantially uniform distention of the engaging portion all along the endless sealing strip whereby continuity of effective sealing against the canopy is assured.

Under inflation the engaging portion tends to move upwardly and, if unrestricted by the canopy, to assume a semi-circular shape in cross-section, whereby the engaging portion first contacts and then stretches laterally and flattens partially so as to resiliently press against the adjacent edge surface 16 of the canopy 15 in sealing relation therewith. The longitudinal ribs 29 advantageously effect a longitudinal seal at a plurality of spaced-apart positions laterally of the edge surface 16, while the engaging portion stretches and smoothly conforms to such edge surface, as shown especially in Fig. 2. An effective canopy seal is thus maintained by the sealing strip 10 even though the inflating pressure be 5 to 10 lbs. per sq. in. and is greater than the pressure within the cockpit.

Upon deflation of the sealing strip 10 the engaging portion 28 by virtue of its resiliency resumes its downward and nested disposition at the grooved upper face 25 of the base portion, as shown especially in Fig. 3, thereby breaking the canopy seal.

The modified construction 40 shown in Fig. 6 is like that of the sealing strip 10 except that the engaging portion 41 at its intervening region between positions of joinder with the base portion 42 at the margins 43, 44 of the grooved upper face 45 is of less looseness and lateral extent than that of the engaging portion 28 of the strip 20 but is greater than the lateral distance directly across the base portion from the margin 43 to the other margin 44. Thus the engaging portion 41 is in spaced relation at its intervening region to the base portion to facilitate inflation and distends from its nested relationship to the base portion 42 outwardly and upwardly to a lesser extent than the engaging portion 28 and seals against the canopy 15 which may be positioned relatively closer to the support member 11 as compared to that shown in Fig. 2. The engaging portion 41 may or may not be longitudinally ribbed at its outer surface, although shown without ribs in Fig. 6.

The modified construction 50 shown in Fig. 7 is like that of the sealing strip 10 except that the engaging portion 51 at its intervening region between positions of joinder with the base portion 52 at the margins 53, 54 of the grooved upper face 55 is of greater looseness and lateral extent than that of the engaging portion 28 of the strip 20 for distending from its nested position outwardly and upwardly to a greater extent than the engaging portion 28. The sealing strip 50 is useful for applications where the canopy 15 is positioned relatively further away from the support member 11 than that shown in Fig. 2. The engaging portion 51 rests in loose folds against the upper face 55 in the space of the groove 56 and may, if desired, have a smooth outer surface as shown in Fig. 7.

The sealing strip construction 60 shown in Fig. 8 differs from that of the sealing strip 10 in that the base portion 61 is arcuate in cross-section and is of relatively lesser wall thickness and stiffness, especially at the bottom of the groove 62 in the upper face 63, as compared to that of the base portion 20 of the strip 10. It also differs in that the engaging portion 64 has an inner longitudinal rib 66 for preventing sealing of the portion against the upper face 63 and has extensions wholly covering the bottom and sides of the base portion 61 to reinforce the same, the adjacent marginal edges of the engaging portion 64 being butted together at 65 at the bottom of the base portion.

The modified construction 70 shown in Fig. 9 is like that of the sealing strip 10 except that the base portion 71 is provided at its bottom with recesses 72, 73 to receive marginal portions 74, 75 of the engaging portion 76. In addition, there is provided an attaching portion 77 of flexible rubber-like material having a reinforcement 78 therein of suitable inextensible square-woven fabric material. The attaching portion overlies and is adhesively secured to the bottom of the base portion 71 and projects beyond a side thereof for attaching purposes.

The sealing strip 80 shown in Fig. 10 differs from the sealing strip 10 in that it consists entirely of an extruded body of suitable rubber-like material having united and nested base 81 and engaging 82 portions without fabric reinforcement. The line at 83 indicates the grooved upper face of the base portion and the separation of the engaging portion from the base portion effected in the extruding operation and maintained during vulcanization by soapstone or other anti-bonding material. The recesses 84, 85 at the margins of the grooved upper face 83 of the base portion 82 promote flexure of the engaging portion 82 in the inflated condition of the strip 80.

The modified construction 90 shown in Fig. 11 and 12 includes the features and advantages of the sealing strip 10 but differs in respect of the method of making the assembly and the provision of distensibility. Fig. 11 shows an assembly, prior to vulcanization, of an inflatable tube 91 including an engaging portion 92 and a mounting portion 93 mounted in a flattened condition upon an upper face 94 of a base portion 95 having laterally spaced-spart side walls 96, 97 interconnected one to the other by a thin bottom portion 98.

The base portion 95 is of suitable flexible, rubber-like material having desirably an extruded shape formed, as shown in Fig. 11, by the interconnected, triangular-in-section, side walls 96, 97. The base portion 95 is supported with the upper face 94 in a flat plane for facilitating the adhesive attachment of the flattened tube 91 as by a suitable rubber cement.

The inflatable tube 91 is desirably made of reinforced rubber strip material having a composite wall construction like that described hereinabove for the engaging portion 28 of the sealing strip 10. However, the rubber-like material of the thin outer layer at the engaging portion 92 of the tube may contain electrically conductive material in particle or filamentary form for electrical heating purposes to prevent freezing of the distended engaging portion 92 to the canopy 15 under ice-forming conditions. The flattened tube 91 may be made by folding the sides of the strip material upon themselves with their edges abutting and joined adhesively to one another at 99, whereby the mounting portion 93 is provided for union with and adherence to the upper face 94 of the base portion.

After assembly of the tube 91 and the base portion 95, the side walls 96, 97 are each flexed upwardly through a ninety (90) degree angle, whereby the upper face 94 defines a triangular-in-section longitudinally groove in which is nested the tube 91 arranged in V-shape as shown in Fig. 12. The assembly is then vulcanized to maintain the uninflated strip in the shape shown in Fig. 12.

The construction has provision of maximum freedom of flexure at the margins of the tube facilitating maximum freedom of distension of the engaging portion 92 under inflation while retaining the inherent self-return action of the resilient engaging portion to its nested position upon deflation of the strip 90. The mounting portion 93 by virtue of its attachment is an integral part of the base portion 95 intermediate the margins of the upper face 94 for strengthening the portion 95 against objectionable distortion, especially under inflation of the strip. Although shown without, the engaging portion 92 may have a ribbed outer surface like the engaging portion 28 of the strip 10 and desirably may have a rib at its inner surface like the engaging portion 64 of the strip 60. Suitable means in communication with the space of the tube 91 may be provided for inflation purposes.

Upon inflation the engaging portion 92 of the tube distends upwardly into sealing contact against the canopy 15 substantially as described hereinabove for the strip 10 and shown especially in Fig. 2. Upon deflation the engaging portion resumes its nested disposition in the groove of the base portion as shown especially in Fig. 12.

Variations may be made without departing from the scope of the invention as it is defined in the following claims.

I claim:

1. An inflatable sealing strip for disposition between spaced-apart elements, said sealing strip comprising a base portion of flexible rubber-like material of generally U-shape in cross-section for mounting on one of said elements, the bottom and side walls of said base portion providing a longitudinal recess with inclined sides at the upper face of said portion, and a distensible engaging portion of resilient rubber-like strip material including therein an elastic fabric reinforcement of greater stretchability laterally than that longitudinally for contacting the other element, said engaging portion being in overlapping attached relation to said side walls with an intervening portion of said engaging portion between the positions of attachment to said side walls in overlying separated relation to said upper face, said intervening portion having a lateral extent between said positions of attachment greater than the lateral distance from one of said positions of attachment directly across the strip and recess to the other position of attachment so that said engaging portion at said intervening portion has slack and is normally disposed in inwardly turned condition within said recess in the uninflated condition of the strip and is inflatable from its position within said recess to an extended position outwardly of said recess for seating against the other element in sealing relation therewith in the inflated condition of the strip, said walls of said base portion being relatively thick as compared to the thickness of said engaging portion for resisting distortion of said base portion.

2. An inflatable sealing strip as defined in claim 1 in which said resilient rubber-like material of said engaging portion overlies and underlies said elastic fabric reinforcement thereof for preventing leakage therethrough of the inflation medium, and in which said overlying rubber-like material comprises an outer surface of resilient rubber-like material resistant to deterioration from the action of weather, sunlight, ozone and oil.

3. An inflatable sealing strip as defined in claim 14 in which said flexible element includes resilient rubber-like material impervious to the inflating medium and having a textile reinforcement bonded to said rubber-like material.

4. An inflatable sealing strip as defined in claim 14 in which said channeled base comprises elastic material of generally U-shaped form in cross-section with a substantially flat bottom face and substantially flat exterior side faces extending upwardly therefrom, and in which said flexible element across said channel continues along said side faces in overlapping attached relation thereto and comprises elastic composition impervious to the inflating medium and having a reinforcement therein.

5. An inflatable sealing strip as defined in claim 14 in which said channeled base comprises elastic material of generally U-shaped form in cross-section providing a curved outer face and a curved inner face defining said channel and merging with said outer face at the free ends of the U, and in which said flexible element has a longitudinal projection extending toward said inner face of said base for preventing said element from sealing against said inner face of said base in the uninflated condition of the strip, and said flexible element comprises elastic composition impervious to the inflating medium and having a fabric reinforcement embedded therein.

6. An inflatable sealing strip as defined in claim 14 in which said channeled base comprises flexible rubber-like material having an attaching extension of said material at a side thereof with a fabric reinforcement bonded to said extension, and in which said flexible element across said channel continues along the sides of said base in overlapping attached relation thereto and comprises a resilient rubber-like composition impervious to the inflating medium and having a fabric reinforcement embedded therein.

7. An inflatable sealing strip for disposition between spaced-apart structures, said sealing strip comprising a channeled base for support by one of said structures and a flexible element mounted on said base and extending across the channel to define therewith an inflating space, said flexible element having a wall of relatively greater flexibility as compared to that of said base and being of greater width than said channel so as to have slack in the uninflated condition of the strip and be received and normally disposed in inwardly turned condition within said channel in the uninflated condition of the strip, said element having on its inner face a projection thereon for contacting said base in said channel to prevent said element from sealing against said base in the uninflated condition, and said element by virtue of its flexibility and greater width than said channel being inflatable from its position within said channel to a structure-engaging position substantially outward of said channel.

8. An inflatable sealing strip for disposition between spaced-apart structures, said sealing strip comprising a base of flexible material for support by one of said structures and having laterally spaced-apart side walls disposed generally upright of the base providing a longitudinal channel of generally U-shaped form in cross-section at the upper face of said base, and a flexible distensible element of resilient rubber material having an elastic fabric reinforcement therein to resist local stretching mounted on said base and extending across said channel to define therewith an inflating space, said flexible distensible element being in overlapping attached relation to said side walls at their exterior faces thereof with an intervening portion of said element intermediate the margins of said upper face in overlying separated relation to said upper face and said flexible distensible element having at said intervening portion greater width than said channel so as to have slack in the uninflated condition of the strip and be received and normally disposed in inwardly turned condition within said channel in the uninflated condition of the strip and be distensible upwardly against the other structure in sealing relation therewith in the inflated condition of the strip.

9. An inflatable sealing strip for disposition between spaced-apart structures, said sealing strip comprising a base of flexible material for support by one of said structures and having laterally spaced-apart side walls disposed generally upright of the base providing a longitudinal channel of generally U-shaped form in cross-section at the upper face of said base, and a flexible distensible element of resilient rubber material having an elastic fabric reinforcement therein to resist local stretching mounted on said base and extending across said channel to define therewith an inflating space, said flexible distensible element being in overlapping attached relation to said side walls at the exterior faces thereof with an intervening portion of said element intermediate the margins of said upper face in overlying separated relation to said upper face and said flexible distensible element having at said intervening portion greater width than said channel so as to have slack in the uninflated condition of the strip and be received and normally disposed in inwardly turned condition within said channel in conformance to the lateral contour of said upper face at said channel in the uninflated condition of the strip and be distensible upwardly against the other structure in sealing relation therewith in the inflated condition of the strip.

10. An inflatable sealing strip for disposition between spaced-apart structures, said sealing strip comprising a base of flexible material for support by one of said structures and having laterally spaced-apart side walls disposed generally upright of the base providing a longitudinal channel of generally U-shaped form in cross-section at the upper face of said base, and a flexible distensible element of resilient rubber material having an elastic fabric reinforcement therein to resist local stretching mounted on said base and extending across said channel to define therewith an inflating space, said flexible distensible element being in overlapping attached relation to said side walls at the exterior faces thereof with an intervening portion of said element intermediate the margins of said upper face in overlying separated relation to said upper face and said flexible distensible element having at said intervening portion greater width than said channel so as to have slack in the uninflated condition of the strip and be received and normally disposed in inwardly turned condition within said channel in loosely folded disposition in the uninflated condition of the strip and be distensible upwardly against the other structure in sealing relation therewith in the inflated condition of the strip.

11. An inflatable sealing strip for disposition between spaced-apart structures, said sealing strip comprising a base of flexible material for support by one of said structures and having laterally spaced-apart side walls disposed generally upright of the base providing a longitudinal channel of generally U-shaped form in cross-section at the upper face of said base, and a flexible distensible element of resilient rubber material having an elastic fabric reinforcement therein to resist local stretching mounted on said base and extending across said channel to define therewith an inflating space, said flexible distensible element being in overlapping attached relation to said side walls at the exterior faces thereof with an intervening portion of said element intermediate the margins of said upper face in overlying separated relation to said upper face and said flexible distensible element having at said intervening portion greater width than said channel so as to have slack in the uninflated condition of the strip and be received and normally disposed in inwardly turned condition within said channel in suspended disposition and spaced-apart relation to said upper face at the bottom of said channel in the uninflated condition of the strip and be distensible upwardly against the other structure in sealing relation therewith in the inflated condition of the strip.

12. An inflatable sealing strip for disposition between spaced-apart structures, said sealing strip comprising a base for support by one of said structures and having laterally spaced-apart side walls of flexible rubber material disposed generally upright of the base providing a longitudinal channel of generally U-shaped form in cross-section at the upper face of said base, said side walls at their outer surfaces at positions thereon spaced downwardly from the margins of said upper face having recesses in the rubber material, and a flexible distensible element of resilient rubber material having an elastic fabric reinforcement therein to resist local stretching mounted on said base and extending across said channel to define therewith an inflating space, said flexible distensible element being in overlapping attached relation to said side walls at said outer surfaces thereof and terminating in marginal portions of said element anchored in said recesses in bonded sealing relation to the rubber material of said side walls to seal the edges of said marginal portions, and said flexible distensible element having an intervening portion intermediate the margins of said upper face in overlying separated relation to said upper face and having at said intervening portion greater width than said channel so as to have slack in the uninflated condition of the strip and be received and normally disposed in inwardly turned condition within said channel in the uninflated condition of the strip and be distensible upwardly against the other structure in sealing relation therewith in the inflated condition of the strip.

13. An inflatable sealing strip for disposition between spaced-apart structures, said sealing strip comprising a base for support by one of said structures and having a bottom wall and laterally spaced-apart side walls of resilient rubber material projecting from said bottom wall of the base and said side walls having a generally upright disposition relative to said bottom wall in the inflated condition of the strip so that inner surfaces of said bottom wall and said side walls provide a longitudinal channel at the upper face of said base in said inflated condition of the strip, and a flexible distensible element of resilient rubber material having an elastic fabric reinforcement therein to resist local stretching mounted on said base and extending from one of said side walls across said base at said upper face thereof to the other side wall in overlapping attached relation to said side walls at the outer surfaces thereof with an intervening portion of said distensible element in overlying separated relation to said upper face at said inner surfaces, said flexible distensible element at said intervening portion having greater width than that of said channel and greater flexibility than said side walls so as to extend upwardly in continuation of said side walls and in outwardly bulged disposition overlying said channel in the inflated condition of the strip for contacting the other structure in sealing relation therewith and so as to be returnable from said bulged disposition and be normally disposed by virtue of the resiliency and flexibility of said element in adjacent approximately conforming relation to the lateral contour of said inner surfaces of said side walls in the uninflated condition of the strip.

14. An inflatable sealing strip for disposition between spaced-apart structures, said sealing strip comprising a base for support by one of the structures and having sidewalls and a bottom wall forming a single channel extending along the strip, and a flexible element mounted on said base and extending across said channel to define therewith an inflating space, said flexible element having a wall of relatively greater flexibility as compared to that of said base and a thickness less than the depth of said channel and a width between its positions of joinder to said base greater than the width of said channel across the mouth thereof and being normally disposed in inwardly turned condition within said channel with said flexible element having side portions that lie along the inside of the sidewalls of said base and an integral mid-portion that lies along the inside of the bottom wall of said base in the uninflated condition of the strip, said element by virtue of its flexibility and its greater width than said channel, being inflatable from its normal position entirely within said channel to a structure-engaging position substantially outward of said channel for contacting the other structure in sealing relation therewith.

15. An inflatable sealing strip for disposition between spaced-apart structures, said sealing strip comprising a base for support by one of the structures and having sidewalls and a bottom wall forming a single channel extending along the strip, and a flexible element mounted on said base and extending across said channel to define therewith an inflating space, said flexible element having a wall of relatively greater flexibility as compared to that of said base and a thickness less than the depth of said channel and a width between its positions of joinder to said base greater than the width of said channel across the mouth thereof and being normally disposed in inwardly turned condition within said channel with said flexible element having side portions that lie along the inside of the sidewalls of said base and an integral mid-portion that lies along the inside of the bottom wall of said base in the uninflated condition of the strip, said flexible element having on its outer face at a position therein overlying said channel a structure-engaging flexible projection extending outwardly of and continuously along the strip, said flexible projection having an overall width substantially less than that of said channel and a disposition normally in said channel along with said flexible element therein in the uninflated condition of the strip, said flexible element by virtue of its flexibility and its greater width than said channel, being inflatable from its normal position entirely within said channel to a structure-engaging position of said flexible projection substantially outward of said channel for seating said flexible projection against the other structure in sealing relation therewith.

16. An inflatable sealing strip for disposition between spaced-apart structures, said sealing strip comprising a flexible base portion for support by one of the structures and having sidewalls spaced-apart laterally of the strip and a bottom wall interconnecting said sidewalls at their bases and forming therewith a single channel extending along the strip, and a distensible structure-engaging portion of flexible impervious material extending laterally from one sidewall across the mouth of said channel to the other sidewall and joined to said sidewalls at their upper margins to define with said base portion an inflating space in said channel, said structure-engaging portion between its positions of joinder to said sidewalls having a wall of greater flexibility than that of said sidewalls and a thickness less than that of said sidewalls and also less than the depth of said channel and a width greater than the width of said channel across said mouth thereof and being normally disposed in inwardly turned condition within said channel with said strucutre-engaging portion having side portions that lie adjacent and along the inside of said sidewalls of the base portion and an integral mid-portion that lies adjacent and along the inside of said bottom wall of the base portion in the uninflated condition of the strip, said structure-engaging portion by virtue of its flexibility and its greater width than said channel, being inflatable from its normal position entirely within said channel to an extended position outwardly of said channel for seating against the other structure in sealing relation therewith.

17. An inflatable sealing strip for disposition between spaced-apart structures, said sealing strip comprising a flexible base portion for mounting upon one of the structures and having in its upper face intermediate the side margins thereof a central channel of generally U-shaped cross-section extending along the strip and said base portion having laterally spaced-apart side surfaces in said channel extending upwardly from the bottom of the channel to the mouth thereof, and a distensible structure-engaging portion of extensively flexible impervious slightly stretchable rubber-like material extending laterally from one of said side margins across said channel to the other side margin and joined to said base portion at said side margins of said upper face with the intervening region of said structure-engaging portion between its positions of joinder being in overlying separated relation to the channeled upper face of said base portion, said structure-engaging portion throughout said intervening region thereof having a wall of greater flexibility than that of said base portion and a thickness less than the depth of said channel and a width greater than the width of said channel across the mouth thereof and having normally an inwardly turned disposition within said channel with said structure-engaging portion having side portions lying along and substantially conforming to said side surfaces and an integral mid-portion lying along and substantially conforming to said bottom of the U-shaped central channel in the uninflated condition of the strip, said structure-engaging portion by virtue of its flexibility and slight stretchability and its greater width than said channel, being inflatable from its normal position entirely within said channel to an extended position upwardly and outwardly of said channel for seating against the other structure in sealing relation therewith.

References Cited in the file of this patent

UNITED STATES PATENTS

| | | |
|---|---|---|
| 2,041,946 | Nave | May 26, 1936 |
| 2,301,963 | Marple et al. | Nov. 17, 1942 |
| 2,306,990 | Essl | Dec. 29, 1942 |
| 2,361,298 | Laddon | Oct. 24, 1944 |
| 2,401,624 | Petter et al. | June 4, 1946 |
| 2,443,751 | Terepin et al. | June 22, 1948 |

FOREIGN PATENTS

| | | |
|---|---|---|
| 562,808 | Great Britain | July 17, 1944 |
| 562,844 | Great Britain | July 19, 1944 |